United States Patent [19]

Tanaru et al.

[11] Patent Number: 5,234,739
[45] Date of Patent: Aug. 10, 1993

[54] POLYTETRAFLUOROETHYLENE POROUS FILM AND PREPARATION AND USE THEREOF

[75] Inventors: Shinji Tanaru; Osamu Tanaka; Hirofumi Nishibayashi; Osamu Inoue; Katsutoshi Yamamoto; Toshio Kusumi, all of Osaka, Japan

[73] Assignee: Daikin Industries Ltd., Osaka, Japan

[21] Appl. No.: 916,618

[22] Filed: Jul. 22, 1992

[30] Foreign Application Priority Data

Jul. 23, 1991 [JP] Japan .................. 3-182364

[51] Int. Cl.$^5$ ............................ B32B 3/10; D02J 1/06
[52] U.S. Cl. .................. 428/131; 264/288.8; 264/DIG. 73; 428/315.5; 428/315.7; 428/422; 428/286
[58] Field of Search ............ 264/288.8, DIG. 73; 428/131, 315.5, 315.7, 422

[56] References Cited

U.S. PATENT DOCUMENTS

| 3,953,566 | 4/1976 | Gore | 428/422 |
| 4,187,390 | 2/1980 | Gore | 428/315.5 |
| 4,596,837 | 6/1986 | Yamamoto et al. | 521/145 |
| 4,671,754 | 6/1987 | Okita et al. | 425/66 |
| 4,743,480 | 5/1988 | Campbell et al. | 428/422 |
| 4,877,433 | 10/1989 | Oshitari | 55/486 |
| 4,877,661 | 10/1989 | House et al. | 428/422 |

FOREIGN PATENT DOCUMENTS

| 0172750 | 2/1986 | European Pat. Off. |
| 0395331 | 10/1990 | European Pat. Off. |
| 0437721 | 7/1991 | European Pat. Off. |
| 2025835 | 1/1930 | United Kingdom |
| 2187460 | 9/1987 | United Kingdom |

Primary Examiner—William J. Van Balen
Attorney, Agent, or Firm—Birch, Stewart, Kolasch & Birch

[57] ABSTRACT

A polytetrafluoroethylene porous film, which is prepared by stretching a semisintered polytetrafluoroethylene material and heating the stretched material at a temperature higher than the melting point of sintered polytetrafluoroethylene, has an area ratio of fibrils to nodes of from 99:1 to 75:25, an average fibril diameter of from 0.05 to 0.2 $\mu$m, a largest node area of not larger than 2 $\mu$m$^2$ and an average pore size of from 0.2 to 0.5 $\mu$m and achieves low pressure loss.

12 Claims, 15 Drawing Sheets

POLYTETRAFLUOROETHYLENE POROUS FILM AND PREPARATION AND USE THEREOF

BACKGROUND OF THE INVENTION

1. Field of the Invention

The present invention relates to a polytetrafluoroethylene (hereinafter referred to as "PTFE") porous film, a process for preparing the same and a filter comprising the same. More particularly, the present invention relates to a novel PTFE porous film useful as an air filter which is suitable for trapping suspended fine particles in air or other gases in an clean room to be used in a semiconductor industry and which causes a small pressure loss of the air or other gases.

2. Description of the Related Art

As a material of the air filter to be used in the clean room, a filter material prepared by forming a sheet from a mixture of glass fibers and a binder is often used. However, such filter material has some drawbacks, for example, presence of adhered minute fibers in the filter material, occurrence of self-dusting during processing or folding of the filter material, or increase of the pressure loss caused by an increased amount of the binder to be added to suppress the self-dusting (cf. Japanese Patent Kokai Publication No. 16019/1988 and corresponding U.S. Pat. No. 4,877,433). In addition, when such filter material is contacted with a certain chemical such as hydrofluoric acid, it makes dust due to deterioration of the glass and the binder.

To solve such drawbacks, an electret filter material made of a synthetic fiber is proposed in Japanese Patent Kokai Publication No. 53365/1979, but it suffers from deterioration of the electret.

To overcome the above defects, it is proposed to use a stretched porous film of PTFE as an auxiliary member for the filter material (cf. Japanese Patent Kokai Publication Nos. 16019/1988 and 284614/1990).

However, this proposal uses a porous PTFE film having a pore size of 1 $\mu$m or larger to prevent increase of the pressure loss.

A theoretical reason for that the suspended particles having a particle size smaller than the above pore size can be trapped may be as follows:

There are following three mechanisms for removing the particles from a fluid by the filter (cf. a brochure of Domnick Hunter Filters Limited).

1. Direct Interception

Comparatively large particles are intercepted by microfibers of the filter material and removed as if they are sieved.

2. Inertial Impaction

When the particles pass through winding spaces among the microfibers, they cannot change their moving directions as quick as the gas so that they collide against the microfibers and adhere thereto.

3. Diffusion/Brownian movement

Motion of very small particles is controlled by intermolecular forces or static electricity and they spirally move in the gas, so that their apparent diameters are increased and they adhere to the microfibers as in the case of the inertial collision.

In addition, the suspended particles can be trapped by an electric charge trapping mechanism by the electret (cf. Japanese Patent Kokai Publication No. 53365/1979). However, as understood from the data of Japanese Patent Kokai Publication No. 284614/1990 and corresponding EP-A-395 331, the particles having the particle size of 1 $\mu$m or less cannot be completely removed by this mechanism.

One of the typical PTFE porous films to be used as the filter material is disclosed in Japanese Patent Publication No. 17216/1981 and corresponding U.S. Pat. No. 4,187,390.

With this PTFE porous film, a draw ratio should be made large to increase a porosity to provide a filter material having a small pressure loss. As the result, a pore size is increased. To decrease the pore size, the draw ratio cannot be made large and the produced porous film has a large pressure loss.

SUMMARY OF THE INVENTION

One object of the present invention is to provide a PTFE porous film having a small pore size and also small pressure loss.

Another object of the present invention is to provide a filter material having improved ability to trap ultrafine particles.

According to a first aspect of the present invention, there is provided a PTFE porous film which is prepared by a semisintered PTFE material and heating the stretched material at a temperature higher than the melting point of sintered PTFE and has an area ratio of fibrils to nodes of from 99:1 to 75:25, an average fibril diameter of from 0.05 to 0.2 $\mu$m and a largest node area of not larger than 2 $\mu$m$^2$ which are determined by an image processing of a scanning electron microscopic photograph, and an average pore size of from 0.2 to 0.5 $\mu$m.

According to a second aspect of the present invention, there is provided a PTFE porous film which has a thickness of not larger than about one twentieth of that of a semisintered PTFE material (for example, when a thickness of the semisintered material is 100 $\mu$m, a thickness of the porous film is 5 $\mu$m or less), an average pore size of from 0.2 to 0.5 $\mu$m and a pressure loss of from 10 to 100 mmH$_2$O when an air is passed through the film at a flow rate of 5.3 cm/sec.

DETAILED DESCRIPTION OF THE INVENTION

Figure 1:
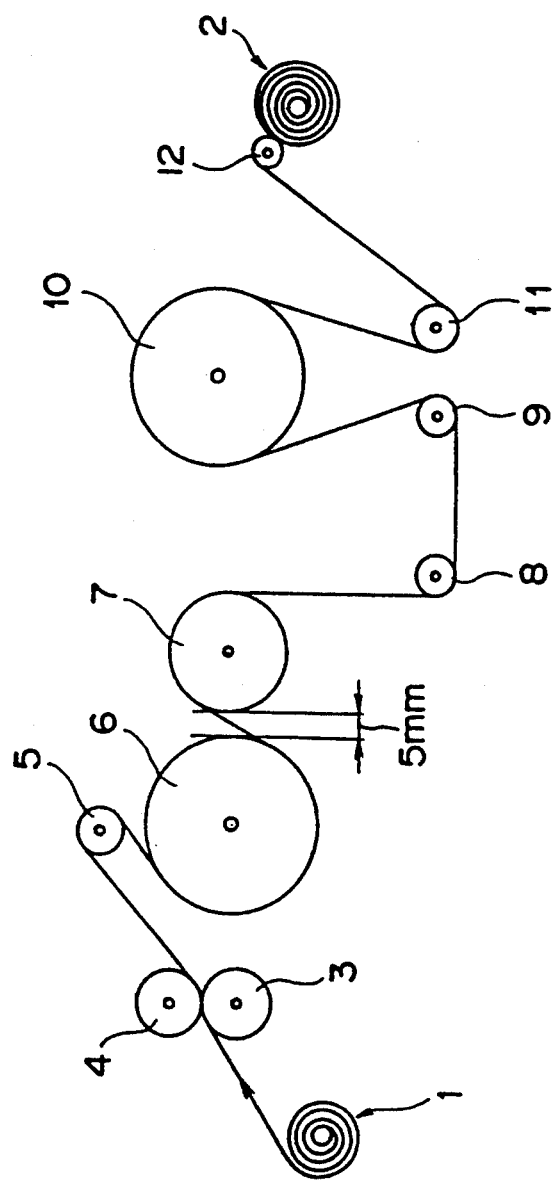
FIG. 1 schematically shows a stretching apparatus used in Examples.

The PTFE porous film of the present invention may be used as such or reinforced by laminating a separate reinforcing material having a low pressure loss. The laminated PTFE porous film has improved handleability. The laminated PTFE porous film can be folded in a pleat form and used as a filter for trapping the ultrafine particles.

As the reinforcing material, nonwoven fabric, woven fabric, mesh or other porous materials may be used. The reinforcing material can be made from various raw materials such as polyolefin (e.g. polyethylene, polypropylene, etc.), polyamide, polyester, aramid or their composite such as a non-woven fabric of a fiber having a core/shell structure, a two-layer non woven fabric of a low melting point material and a high melting point material, a fluororesin (e.g. tetrafluoroethylene/perfluoroalkyl vinyl ether copolymer) (PFA), tetrafluoroethylene/hexafluoropropylene copolymer (FEP), polytetrafluoroethylene (PTFE) etc.) and the like. Among them, the non woven fabric of the fiber having the core/shell structure and the two-layer non woven fabric of the low melting point material and the high melting point material are preferred since they do not shrink during lamination. The laminated film with such reinforcing material is easily processed in the form of a HEPA (high efficiency particulate air) filter and can increase the number of folding pitches when it is processed as a filter element.

A structure of the lamination is not limited. For example, on one or both surfaces of the reinforcing material, the PTFE porous film(s) of the present invention is laminated, or the PTFE porous material is sandwiched between a pair of the reinforcing materials.

The PTFE porous film and the reinforcing material may be laminated by any of conventional methods, for example, thermocompression bonding with melting a part of the reinforcing material or using, as an adhesive, a powder of polyethylene, polyester or PFA, or a hot-melt resin.

In view of the particle removing mechanisms as explained above, it is necessary to prevent desorption of the particles which once adhere to the fiber of the filter or shield the passing through particles so as to trap the particles surely. To this end, the filter material having a pore size smaller than the particle size of the particles to be surely trapped should be used, and therefore the PTFE porous material having a small average pore size is preferred.

The smaller the film thickness, the better, since the pressure loss is in proportional to a film thickness when the pore diameter and the porosity of the filter material are the same.

Even if the pressure loss, pore size, porosity and film thickness of the filter material are the same, an ability to trap the particles varies with the materials. Theoretically, it is preferred to use thin fibers having a diameter of 0.5 $\mu$m or less and decrease an amount of the binder, namely decrease an amount of a material other than the fiber (cf. The 52 Year Preprint of Emi Jun of the Chemical Engineering Society).

The PTFE porous film of the present invention satisfies such conditions.

The PTFE porous film of the present invention will be more in detail explained together with its production process.

An unstretched material of PTFE film to be used as a raw material in the present invention is a semisintered material of PTFE which is disclosed in Japanese Patent Kokai Publication No. 152825/1984 and corresponding to U.S. Pat. No. 4,596,837).

The semisintered PTFE material is biaxially stretched at an area draw ratio of at least 50, preferably at least 100, more preferably at least 250 and then sintered, and the sintered PTFE porous film has a very unique film structure and comprises fibers including substantially no nodes.

The PTFE porous film thus produced has a very small average pore size of, for example, from 0.2 to 0.5 $\mu$m, and its thickness is reduced to one twentieth to one hundredth of the thickness of the unstretched semisintered PTFE material.

Such parameters are suitable for the air filter material to maintain a highly clear space in which a micropattern is formed on a semiconductor.

The PTFE porous film having the above structure has not been produced by the conventional process. For example, Japanese Patent Publication No. 17216/1981 describes, in column 11, line 23 et seq, that "FIG. 1 shows an elongation effect in an uniaxial direction. By biaxial stretching or stretching in all directions, microfibers are formed in those directions, so that a cobweb structure or a cross linked structure is formed and, in association therewith, the strength is increased. Since the number and sizes of spaces between the nodes and the microfibers of the polymer increase, the porosity increases also. This means that the increase of the draw ratio results in only the increase of the pore size.

The pressure loss decreases as the pore size increases or the film thickness decreases. To produce an air filter having a small pore size and low pressure loss, a thin PTFE film is to be used. In the conventional process of Japanese Patent Publication No. 17216/1981, the increase of the draw ratio does not lead to the decrease of the width and thickness. When the draw ratio is extremely increased, the pore size is enlarged. Therefore, the film thickness before stretching should be made thin and the film should be stretched at a small draw ratio.

However, a thickness of the technically usable film before stretching is at most 30 to 50 $\mu$m. By taking quality and a yield of the produced film into consideration, the thickness of the film before stretching is about 100 $\mu$m.

One of the characteristics of the present invention is that the final PTFE porous film can be prepared from a non-stretched film having a thickness of about 100 $\mu$m.

General ranges and preferred ranges of the parameters of the present invention are as follows:

|  | General range | Preferred range |
|---|---|---|
| Sintering degree: | 0.30–0.80 | 0.35–0.70 |
| Draw ratio: |  |  |
| in MD | 4–30 | 5–25 |
| in TD | 10–100 | 15–70 |
| total | 50–1000 | 75–850 |

When the total draw ratio is 250 or larger, the sintering degree is preferably from 0.35 to 0.48.

|  | General range | Preferred range |
|---|---|---|
| Average pore size: | 0.2–0.5 μm | 0.2–0.4 μm |
| Film thickness: | 0.5–15 μm | 0.5–10 μm |
| Area ratio of fibrils to nodes: | 99/1–75/25 | 99/1–85/15 |
| Average fibril diameter: | 0.05–0.2 μm | 0.05–0.2 μm |
| Largest area of node: | <2 μm$^2$ | 0.05–1 μm$^2$ |
| Pressure loss: | 10–100 mmH$_2$O | 10–70 mmH$_2$O |

The sintering degree is defined in Examples.

The PTFE porous film of the present invention can be used as an air filter. In addition, when a liquid is vaporized through the PTFE porous film of the present invention as a partition film, a clear gas containing no impurity particles in the liquid can be obtained. An example of such application is a separation film of a clean moistening apparatus.

According to the present invention, the very thin PTFE porous film can be mass produced and the PTFE porous film of the present invention can be used for an application where water repellency or gas permeability is required.

PREFERRED EMBODIMENTS OF THE INVENTION

The present invention will be explained further in detail by following Examples.

EXAMPLE 1

An unstretched unsintered PTFE film having a thickness of 100 μm, which was prepared from PTFE fine powder (Polyflon (trademark) Fine Powder F-104 manufactured by Daikin Industries, Ltd.), was heated in an oven kept at 339° C. for 50 seconds to obtain a continuous semisintered film having a sintering degree of 0.50.

The semisintered film was cut to a sample of about 9 cm square, and its four sides were clamped with clips of an apparatus which can biaxially stretch a film simultaneously or successively (manufactured by Iwamoto Manufacturing Co., Ltd.), heated at an atmosphere temperature of 320° C. for 15 minutes and stretched at a rate of 100 %/sec. in a longitudinal direction of the film (referred to as "MD" direction) at a draw ratio of 5.

Then, the sample was continuously stretched in a width direction of the film (referred to as "TD" direction) at a draw ratio of 15 while fixing the length in the MD direction to obtain a porous film stretched at a total draw ratio (area draw ratio) of 75.

This stretched film was set on a frame with preventing shrinkage and heat set in an oven kept at 350° C. for 3 minutes.

EXAMPLE 2

The same semisintered film having the sintering degree of 0.5 as used in Example 1 was stretched at the draw ratio of 8 in the MD direction and at the draw ratio of 25 in the TD direction (total draw ratio of 200) in the same manner as in Example 1 to obtain a stretched PTFE porous film.

This porous film was heat set at 350° C. for 3 minutes in the same manner as in Example 1.

EXAMPLE 3

An unstretched unsintered PTFE film having a thickness of 100 μm was prepared from the same PTFE fine powder as used in Example 1 by paste extrusion, calendering with rolls and lubricant drying according to a conventional method, and heated in an oven kept at 338° C. for 45 seconds to obtain a continuous semisintered film having the sintering degree of 0.40. Before this heating step, the film had a width of 215 mm and a specific gravity of 1.55 g/cm$^3$, and after this heating step, the film had a width of 200 mm and a specific gravity of 2.25 g/cm$^3$. However, the thicknesses before and after heating were substantially the same.

This semisintered film was stretched in the longitudinal direction at a draw ratio of 20 using the apparatus shown in FIG. 1.

The stretching conditions in the longitudinal direction are as follows:

Rolls 3 and 4:
 Feeding speed: 0.5 m/min.
 Temperature: room temperature
 Film width: 200 mm
Roll 6:
 Peripheral speed: 4 m/min.
 Temperature: 300° C.
Roll 7:
 Peripheral speed: 10 m/min.
 Temperature: 300° C.
Roll 10:
 Peripheral speed: 10 m/min.
 Temperature: 25° C.
Winding roll 2:
 Winding speed: 10 m/min.
 Temperature: Room temperature
 Film width: 145 mm
Distance between peripheries of rolls 6 and 7: 5 mm An area draw ratio in the longitudinal direction was calculated to be 14.5.

Figure 25:
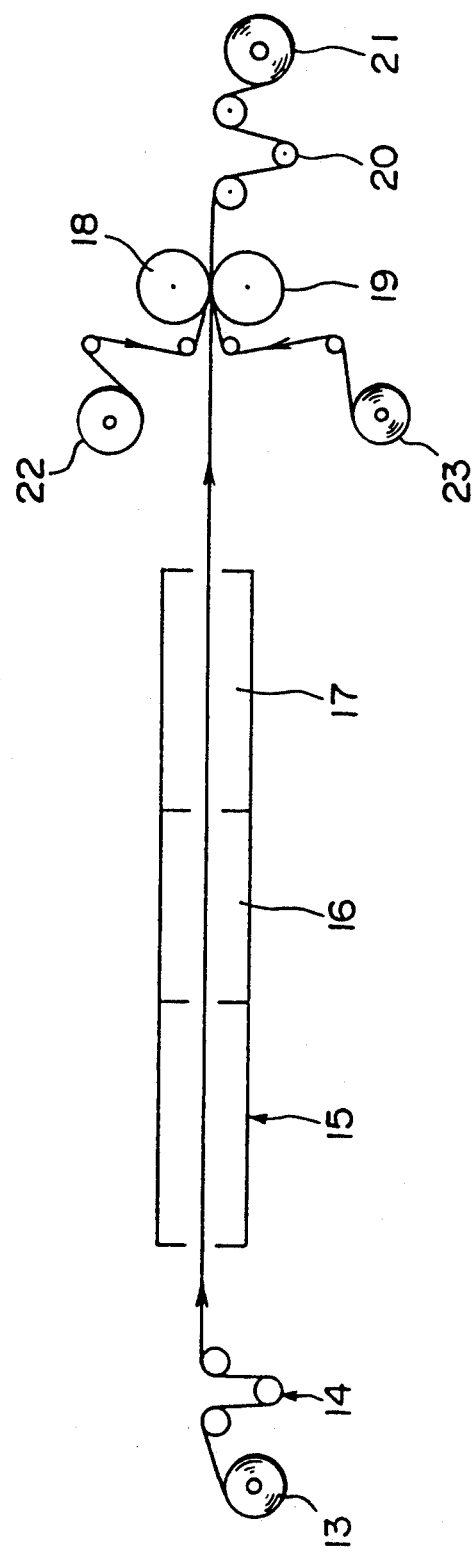
FIG. 25 schematically shows a stretching and laminating apparatus used in Examples 3 and 4.

Then, the longitudinally stretched film was stretched at a draw ratio of about 34 and heat set using an apparatus of FIG. 25 which can successively clamp the both edges of the film with clips.

In FIG. 25, numerals stand for the following parts:
 13: Film feeding roll
 14: Feed control mechanism
 15: Preheating oven
 16: Oven for stretching in a width direction
 17: Heat setting oven
 18, 19: Laminating rolls (19: heating roll)
 20: Winding control mechanism
 21: Winding roll
 22, 23: Drums for laminating non-woven fabrics In the above step, the stretching and heat setting conditions are as follows:
 Film feeding speed: 3 m/min.
 Temp. of preheating oven: 305° C.
 Temp. of oven for stretching in width direction: 320° C.
 Temp. of heat setting oven: 350° C.

The total area draw ratio was calculated to be about 490.

EXAMPLE 4

On the both surface of the film stretched in the width direction, non-woven fabrics were laminated using the apparatus of FIG. 25.

The laminating conditions are as follows:
 Upper non-woven fabric: ELEVES T 1003 WDO (manufactured by UNITIKA)
 Lower non-woven fabric: Melfit BT 030 E (manufactured by UNISEL)

Temp. of heating roll 19: 150° C.

The pressure loss of the laminated PTFE porous film was 25 mmH$_2$O on the average. The pressure loss was measured as follows:

Each edges of the stretched film were cut at an equal distance to obtain a film having a width of 800 mm, and the pressure loss was measured at four points which were present on the same width line at equal intervals. The maximum pressure loss was 27 mmH$_2$O and the minimum pressure loss was 23 mmH$_2$O.

REFERENCE EXAMPLE

The same semisintered PTFE film as used in Example 1 was stretched with the apparatus of FIG. 1. That is, from the feeding roll 1, the semisintered PTFE film was fed to the rolls 6, 7 through the rolls 3, 4, 5, whereby the film was stretched in the MD direction at a draw ratio of 6.

The stretched film was then passed through the rolls 8, 9, the heat setting roll 10, the cooling roll 11 and the roll 12 and wound on the winding roll 2.

The stretching conditions are as follows:
Roll 6:
　Roll surface temperature: 300° C.
　Peripheral speed: 1 m/min.
Roll 7:
　Roll surface temperature: 300° C.
　Peripheral speed: 6 m/min.
Distance between peripheries of rolls 6 and 7: 5 mm
Roll 10:
　Roll surface temperature: 300° C.
　Peripheral speed: synchronous to roll 7

The stretched film was cut to a length of 1 m and a width of 15 cm and the cut film was stretched in the TD direction without fixing the width at a draw ratio of 4 and heat set at 350° C. for 3 minutes. In this stretched film, no node was found according to the definition of the present invention.

With the films produced in Examples 1, 2 and 3 and Reference Example and two commercially available PTFE films having the pore size of 0.1 μm (A: a PTFE porous film assembled in FLUOROGURAD TP Cartridge 0.1 μm manufactured by Millipore) B: T 300 A 293-D PTFE membrane filter manufactured by Advantec Toyo) as Comparative Examples, an average pore size, a film thickness, an area ratio of fibrils to nodes, an average fibril diameter, the largest node area and a pressure loss were measured as described below. The results are shown in the Table.

TABLE

| Example No. | Film thickness (μm) | Av. pore size (μm) | Area ratio of fibrils to nodes | Average fibril diameter (μm) | Largest node area (μm$^2$) | Pressure loss (mmH$_2$O) |
|---|---|---|---|---|---|---|
| 1 | 4.5 | 0.26 | 90/10 | 0.15 | 1.2 | 65 |
| 2 | 1.0 | 0.28 | 95/5 | 0.14 | 0.38 | 45 |
| 3 | 0.8 | 0.30 | 96/4 | 0.14 | 0.36 | 15 |
| Ref. | 50 | 0.27 | — | 0.27 | — | 1300 |
| Com. Ex. | | | | | | |
| A | 70 | 0.28 | 65/35 | 0.15 | 7.5 | 1290 |
| B | 70 | 2.90 | | | | 55 |

From the results of the Table, it is understood that, though the PTFE porous films of the present invention have substantially the same average pore size as those of commercially available film A and Reference Example, they have much smaller pressure loss than the latter and that, though the PTFE porous films of Examples 1 and 2 have substantially the same pressure loss as that of the commercially available film B, they have much larger average pore size than the latter. In addition, it is understood that, when the film is stretched at the area draw ratio of about 500 as in Example 3, the pressure loss can be further decreased while the average pore size is at the same level.

The PTFE porous films of Examples have the larger area ratio of the fibrils to the nodes than the commercially available film A. The PTFE porous films of Examples have the smaller average fibril diameter than that of Reference Example. The largest node area of the PTFE porous film of the present invention is much smaller than that of the commercially available film A.

The properties in the Table are measured as follows:

Average pore size

A mean flow pore size measured according to ASTM F-316-86 is used as an average pore size. Herein, the mean flow pore size is measured using Coulter Porometer (manufactured by Coulter Electronics, UK).

Film thickness

Using lD-110 MH type film thickness meter (manufacture by Mitsutoyo Co., Ltd.), a total thickness of laminated file films is measured and the measured value is divided by 5 to obtain a film thickness of one film.

Pressure loss

A PTFE porous film is cut to a round shape of 47 mm in diameter and set on a filter holder having an effective transmission area of 12.6 cm$^2$ An entrance side is pressurized at 0.4 kg/cm$^2$ with an air and a transmission rate through the porous film is controlled to 5.3 cm/sec. by adjusting a flow rate of the air from an exit side by a flow meter (manufactured by Ueshima Manufacturing Co., Ltd.). Under such conditions, a pressure loss is measured with a manometer.

Sintering degree

A sintering degree of a semisintered PTFE material is defined as follows:

From an unsintered PTFE material, a sample of 3.0±0.1 mg is weighted, and with this sample, a crystalline melting curve is measured. From a semisintered PTFE material, a sample of 3.0±0.1 mg is weighed, and with this sample, a crystalline melting curve is measured.

The crystalline melting curve is recorded using a differential scanning calorimeter (hereinafter referred to as "DSC") such as DSC-50 manufactured by Shimadzu.

Figure 2:
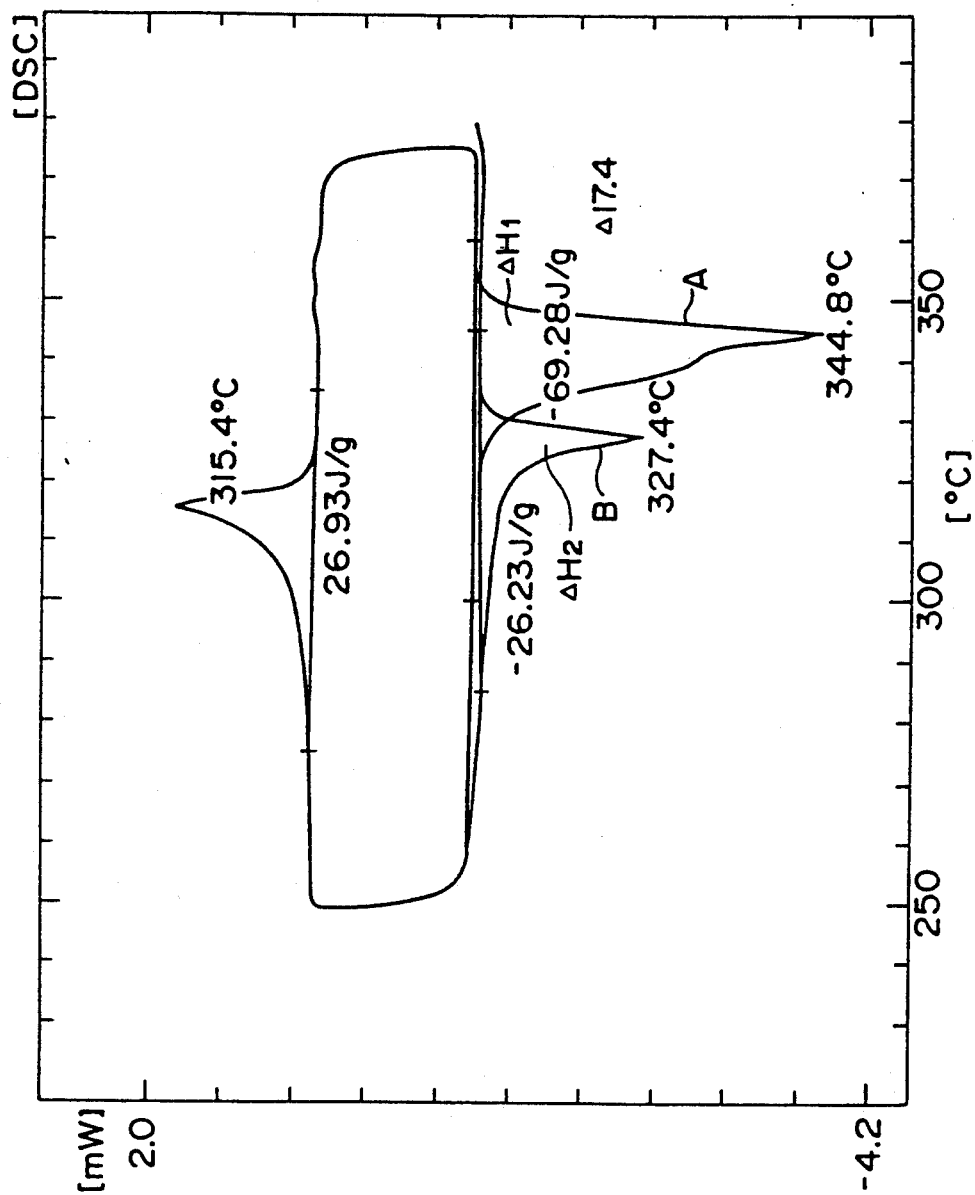
FIG. 2 shows crystalline melting curves of the unsintered PTFE material and the sintered PTFE material.

The sample of the unsintered PTFE material is charged in an aluminum pan of DSC and a heat of fusion of the unsintered PTFE material and that of a sintered PTFE material are measured in the following procedures:

(1) The sample is heated at a heating rate of 50° C./min. up to 250° C and then at a heating rate of 10° C./min. from 250° C to 380° C. An example of a crystalline melting curve recorded in this heating step is shown in FIG. 2, Curve A. A temperature at which an endothermic peak appears is defined as "a melting point of the unsintered PTFE material" or "a melting point of PTFE fine powder".

(2) Immediately after the temperature reaches 380° C., the sample is cooled at a cooling rate of 10° C./min. down to 250° C.

(3) Then, the sample is again heated up to 380° C. at a heating rate of 10° C./min.

An example of a crystalline melting curve recorded in the heating step (3) is shown in FIG. 2, Curve B.

A temperature at which an endothermic peak appears is defined as "a melting point of the sintered PTFE material".

Figure 3:
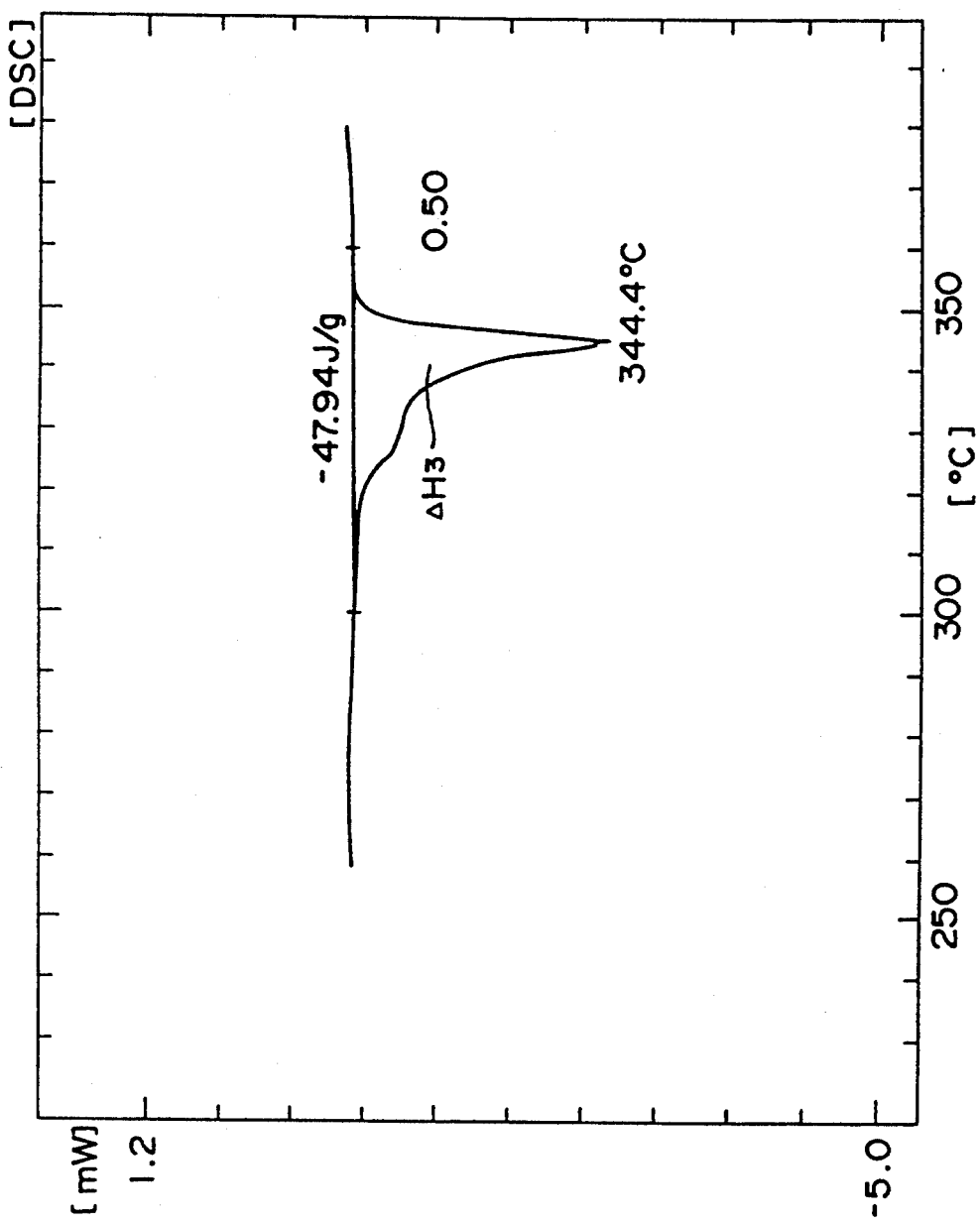
FIG. 3 shows a crystalline melting curve of the semisintered PTFE material.

Next, a crystalline melting curve of the semisintered PTFE material is recorded in the same manner as the step (1). An example of a crystalline melting curve in this step is shown in FIG. 3.

A heat of fusion of each of the unsintered PTFE material ($\Delta H_1$ of FIG. 1), the sintered PTFE material ($\Delta H_2$ of FIG. 1) and the semisintered PTFE material ($\Delta H_3$ of FIG. 2) is proportional to an area surrounded by the crystalline melting curve and a base line, and the heat of fusion is automatically calculated by DSC-50 of Shimadzu.

Then, a sintering degree is calculated according to the following equation:

$$\text{Sintering degree} = (\Delta H_1 - \Delta H_3)/(\Delta H_1 - \Delta H_2)$$

wherein $\Delta H_1$ is a heat of fusion of the unsintered PTFE material, $\Delta H_2$ is a heat of fusion of the sintered PTFE material and $\Delta H_3$ is a heat of fusion of the semisintered PTFE material.

The detailed explanation of the semisintered PTFE material is found in Japanese Patent Kokai Publication No. 152825/1984 and corresponding to U.S. Pat. No. 4,596,837.

Image analysis

An area ratio of fibrils to nodes, an average fibril diameter and the largest nodes area are measured as follows:

A photograph of a surface of a PTFE porous film is taken with a scanning electron microscope (Hitachi S-400, vaporization with Hitachi E-1030) (SEM photograph. Magnification: 1000 to 5000 times). This photograph is scanned with an image processing apparatus (Hardware: TV Image Processor TVIP-4100 II manufactured by Nippon Avionics Co., Ltd.; Control software: TV Image Processor Image Command 4198 supplied by Latock System Engineering Co., Ltd.) to separate the fibrils and the nodes to obtain an image of the fibrils and that of the nodes. By processing the image of the nodes, the largest node area is obtained, and by processing the image of the fibrils, an average fibril diameter is obtained (a ratio of the total area to a half of the total peripheral length).

An area ratio of the fibrils to the nodes calculated as a ratio of the total area of the fibril image and that of the node image.

Figure 4:
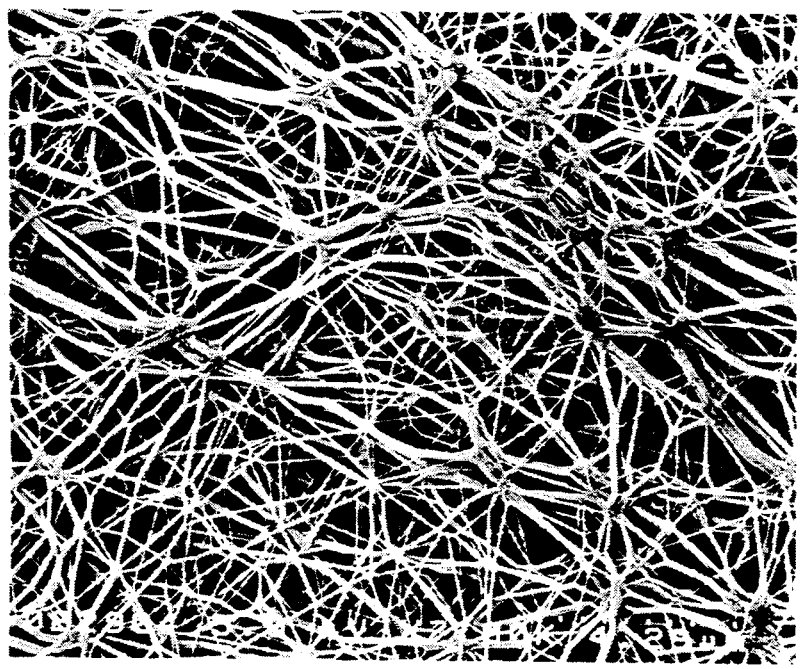
FIGS. 4 and 5 are the SEM photographs of the PTFE porous films prepared in Examples 1 and 2, respectively.
Figure 5:
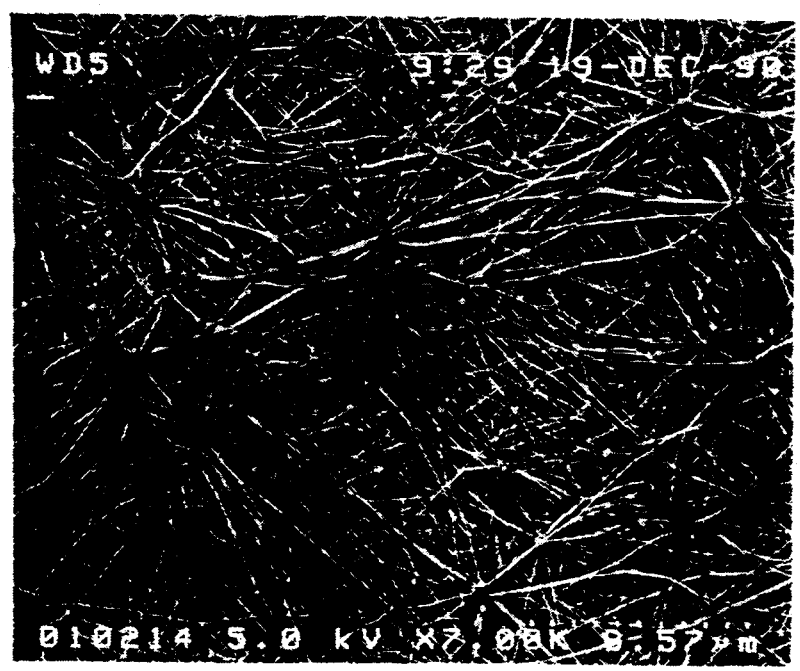

FIGS. 4 and 5 are the SEM photographs of the PTFE porous films prepared in Examples 1 and 2, respectively.

Figure 6:
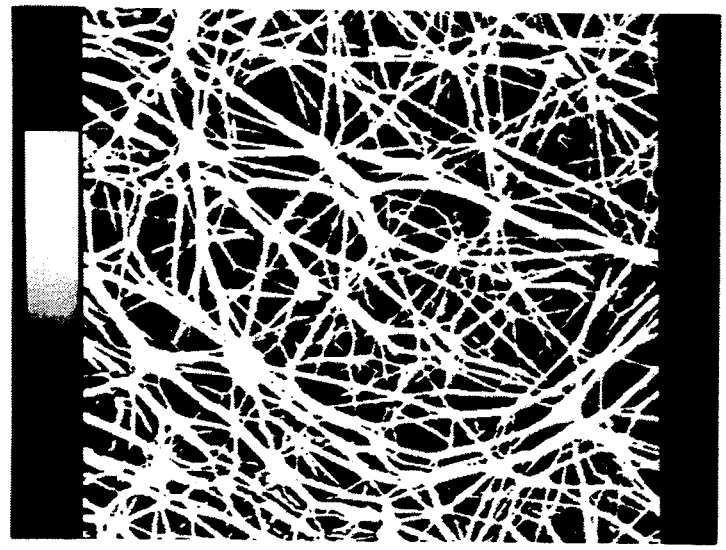
FIGS. 6 and 7 are images obtained by processing FIGS. 4 and 5 as above, respectively.
Figure 7:
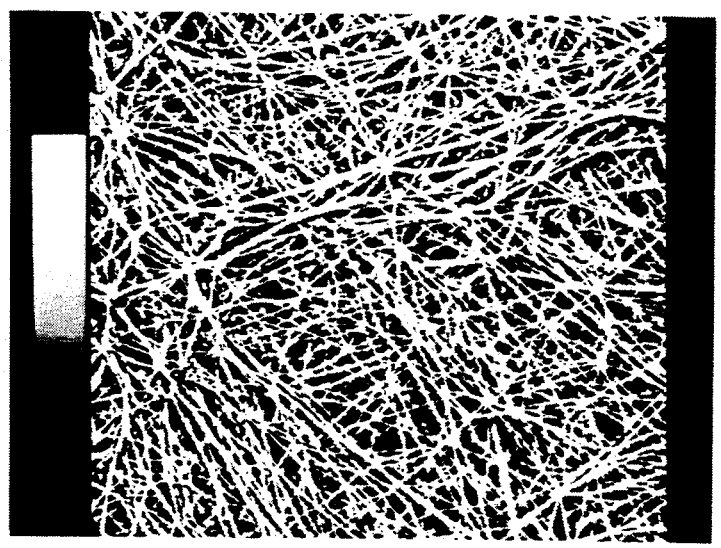

FIGS. 6 and 7 are images obtained by processing FIGS. 4 and 5 as above, respectively.

Figure 8:
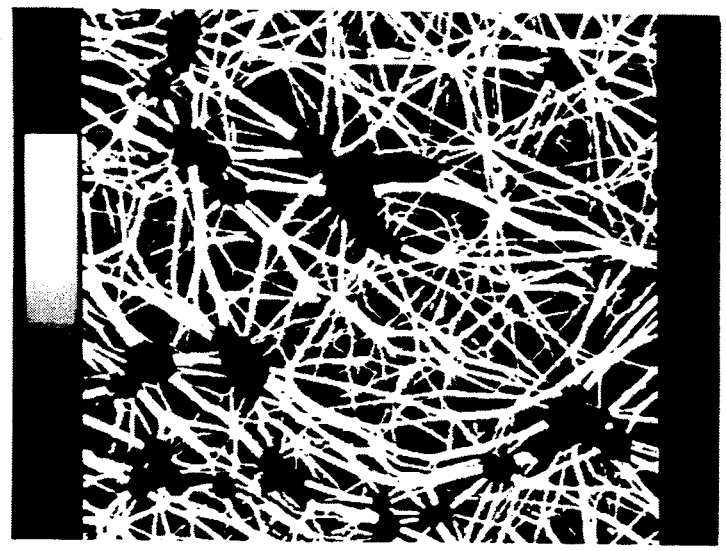
FIGS. 8 and 9 are images of fibrils separated from FIGS. 6 and 7, respectively.
Figure 9:
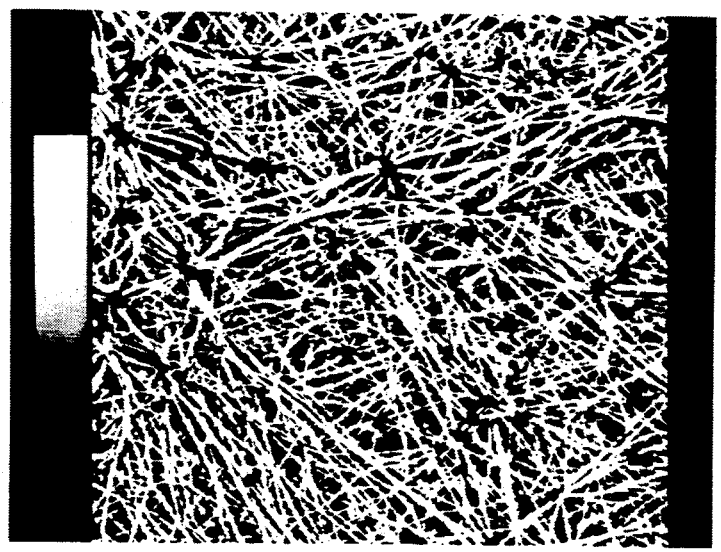

FIGS. 8 and 9 are images of fibrils separated from FIGS. 6 and 7, respectively.

Figure 10:
FIGS. 10 and 11 are images of nodes separated from FIGS. 6 and 7, respectively.
Figure 11:
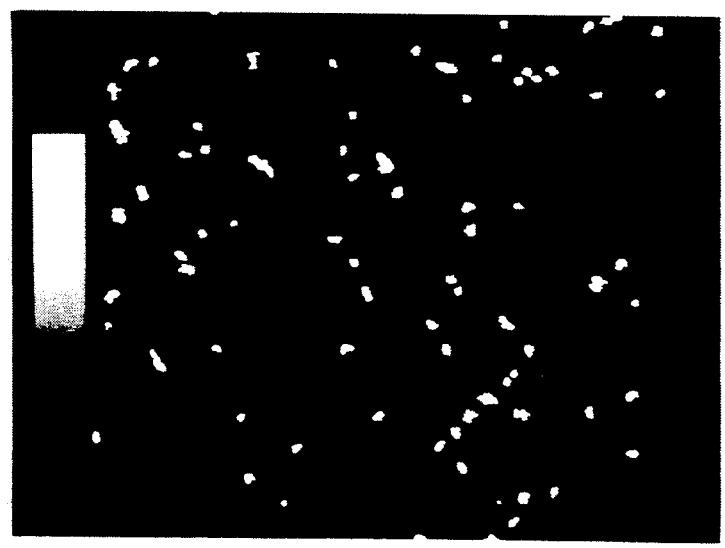

FIGS. 10 and 11 are images of nodes separated from FIGS. 6 and 7, respectively.

Figure 12:
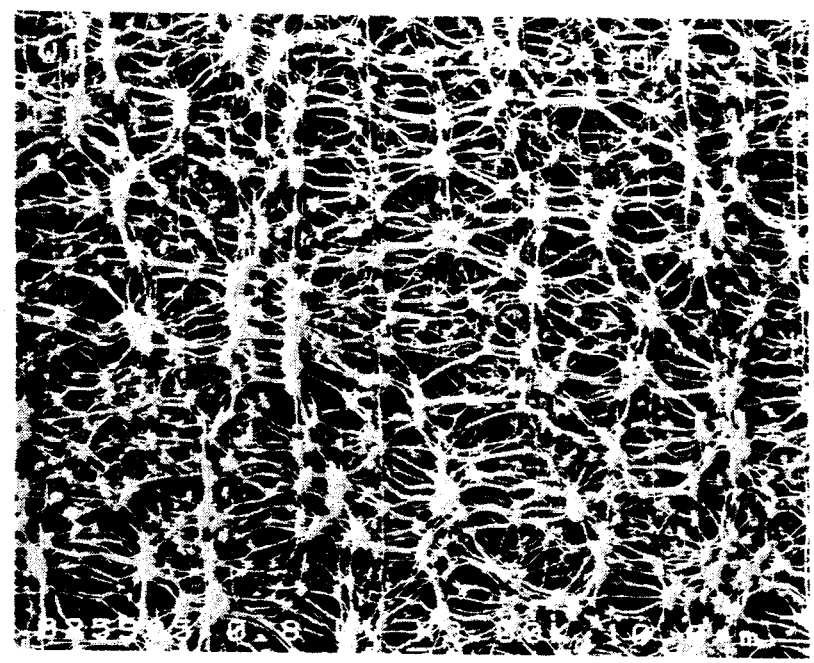
FIGS. 12 and 13 are the SEM photographs of the commercially available PTFE films A and B, respectively.
Figure 13:
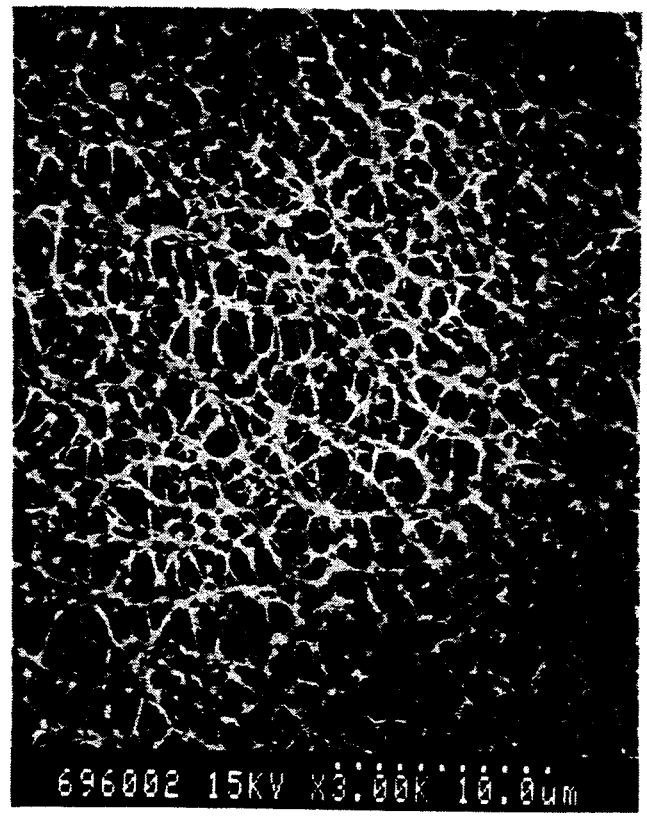

FIGS. 12 and 13 are the SEM photographs of the commercially available PTFE films A and B, respectively.

Figure 14:
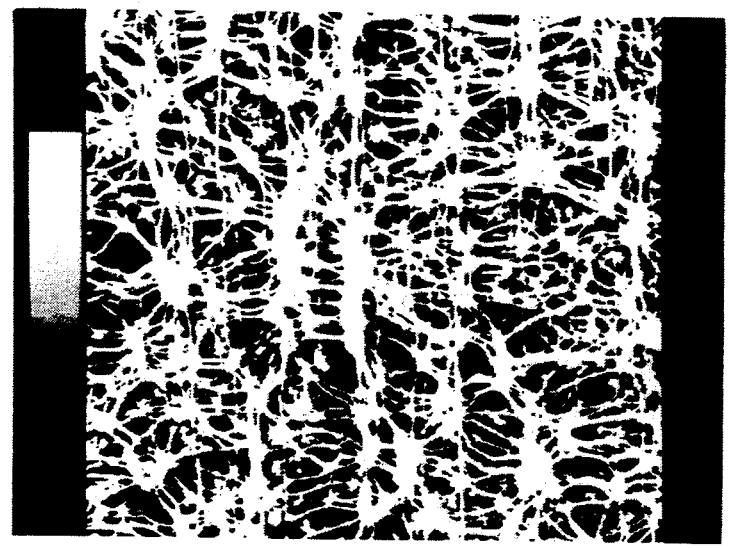
FIGS. 14 and 15 are images of fibrils separated from the images which are obtained by processing FIGS. 12 and 13, respectively.
Figure 15:
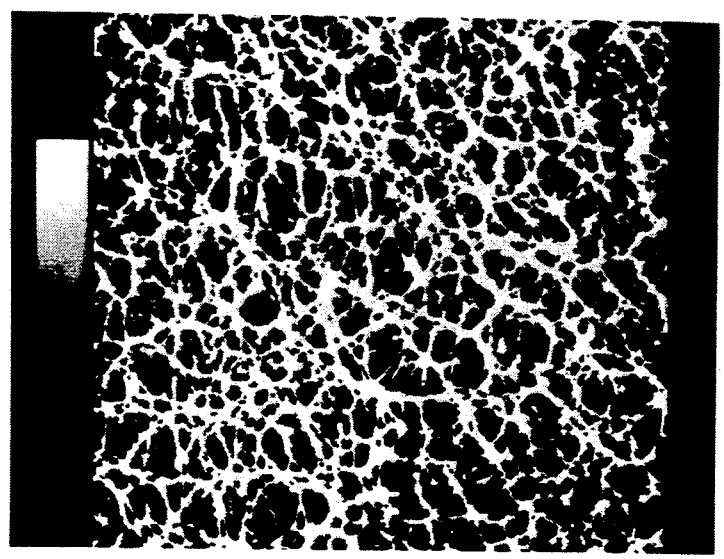

FIGS. 14 and 15 are images of fibrils separated from the images which are obtained by processing FIGS. 12 and 13, respectively.

Figure 16:
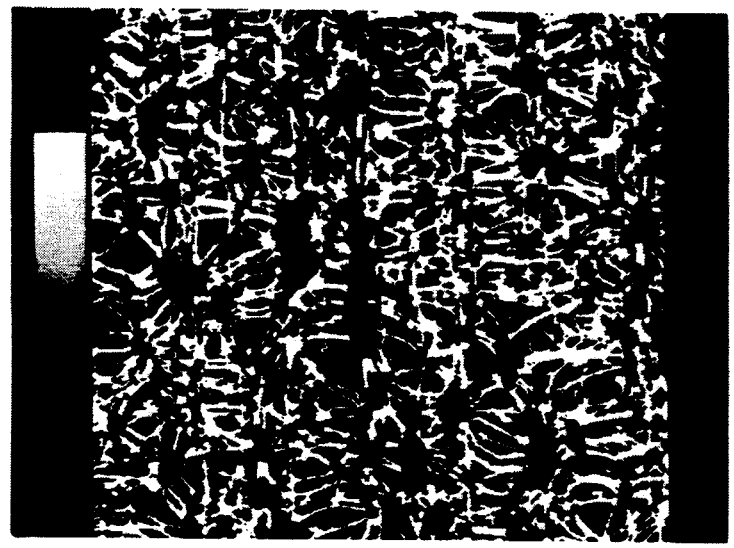
FIGS. 16 and 17 are images of nodes separated from the images which are obtained by processing FIGS. 12 and 13.
Figure 17:
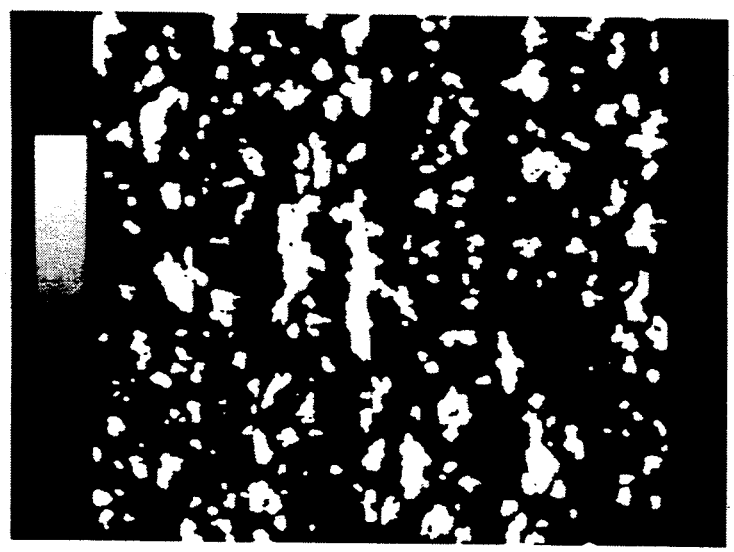

FIGS. 16 and 17 are images of nodes separated from the images which are obtained by processing FIGS. 12 and 13.

Definition of nodes

Figure 18:
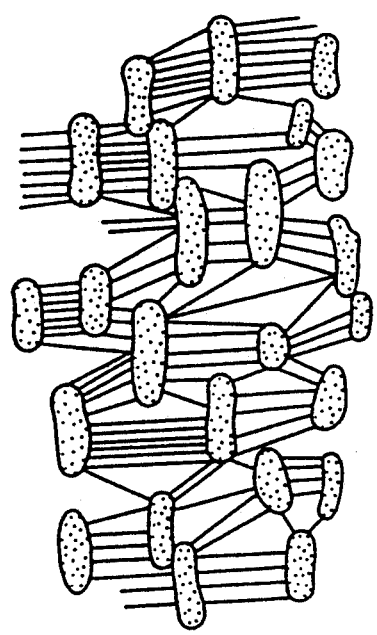
FIGS. 18 to 24 show models of the fibril-node structure of the PTFE porous film.

Herein, the nodes satisfy one of the following properties:

(i) A block to which plural fibrils are connected (dotted areas in FIG. 18)

Figure 19:
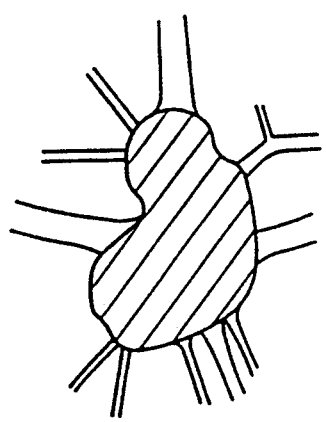
Figure 20:
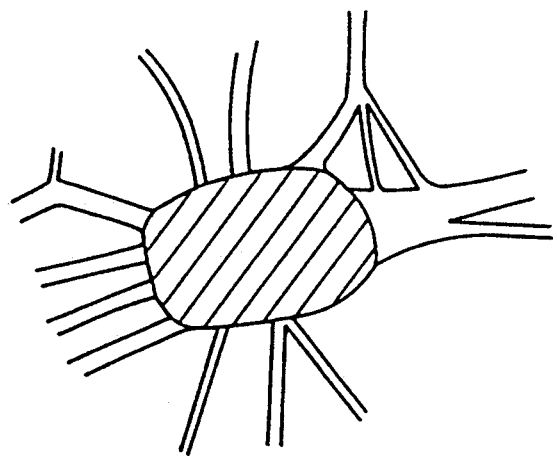
Figure 21:
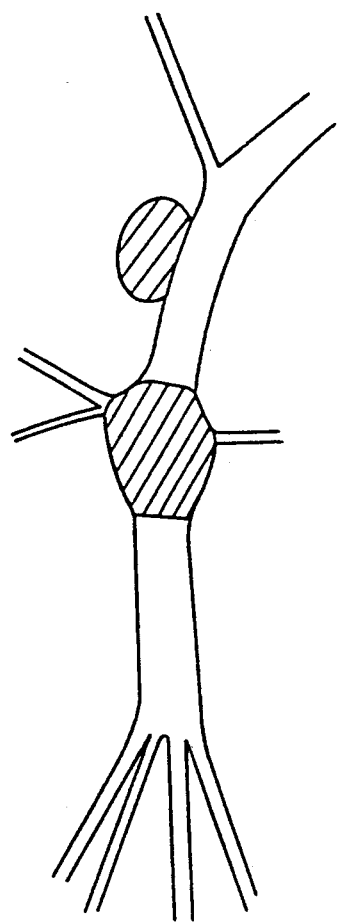
Figure 22:
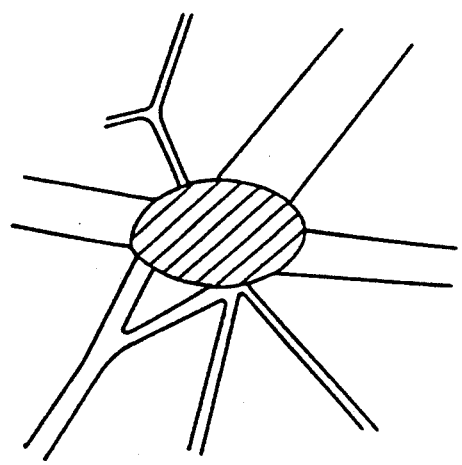
Figure 23:
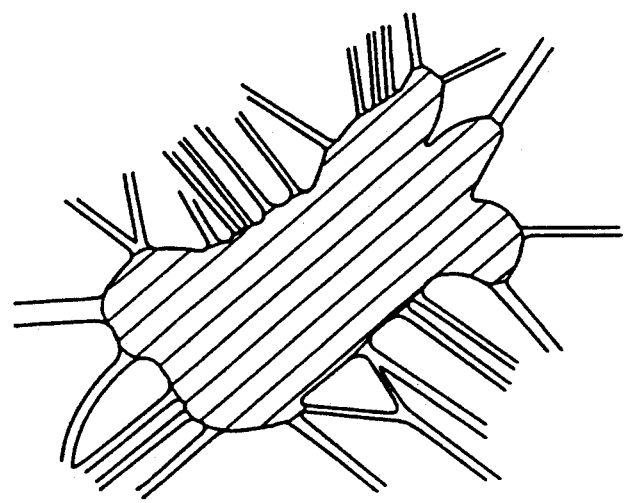

(ii) A block which is larger than a diameter of a fibril connected to the block (iii) A primary particle of agglomerated primary particles from which fibrils are radially extended (hatched areas in FIGS. 19, 22 and 23)

Figure 24:
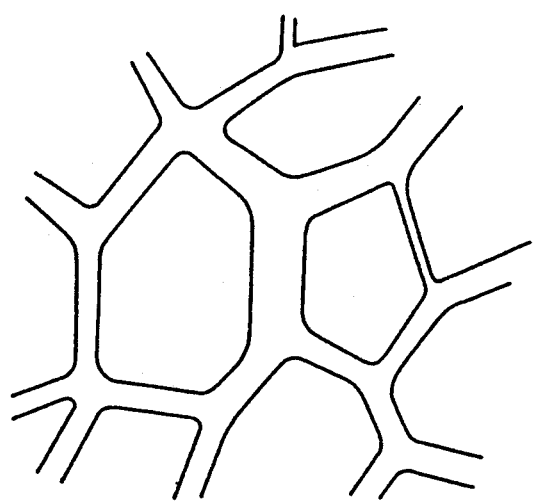

FIG. 24 is an example of a structure which is not regarded as a node. In FIG. 24, the fibrils are branched out, but the size of the branched area in the same as the diameter of the fibril. This branched area is not regarded as a node in the present invention.

What is claimed is:

1. A polytetrafluoroethylene porous film which is prepared by stretching a semisintered polytetrafluoroethylene material and heating the stretched material at a temperature higher than the melting point of sintered polytetrafluoroethylene and has an area ratio of fibrils to nodes of from 99:1 to 75:25, an average fibril diameter of from 0.05 to 0.2 $\mu$m and a largest node area of not larger than 2 $\mu$m$^2$ which are determined by an image processing of a scanning electron microscopic photograph, and an average pore size of from 0.2 to 0.5 $\mu$m.

2. The polytetrafluoroethylene porous film according to claim 1, at least one of surfaces of which is laminated with a reinforcing material film selected from the group consisting of olefinic porous material films and fluororesin porous films with or without an adhesive.

3. A polytetrafluoroethylene porous film having an average pore size of from 0.2 to 0.5 $\mu$m, and a pressure loss of from 10 to 100 mmH$_2$O when an air is passed through at a flow rate of 5.3 cm/sec.

4. A polytetrafluoroethylene porous film which is prepared by biaxially stretching a semisintered polytetrafluoroethylene material at an area draw ratio of at least 50 and heat setting the stretched film at a temperature higher than a melting point of sintered polytetrafluoroethylene.

5. The polytetrafluoroethylene porous film according to claim 4, at least one of surfaces of which is laminated with a reinforcing material film selected from the group consisting of olefinic porous material films and fluororesin porous films with or without an adhesive.

6. A process for preparing a polytetrafluoroethylene porous film according to claim 1, comprising the steps of biaxially stretching a semisintered polytetrafluoroethylene at an area draw ratio of at least 50 and heat setting the stretched film at a temperature higher than a melting point of polytetrafluoroethylene.

7. The process according to claim 6, wherein the prepared porous film has a thickness of not larger than about one twentieth of that of the semisintered polytetrafluoroethylene material.

8. An air filter comprising a polytetrafluoroethylene porous film according to claim 1.

9. An air filter comprising a polytetrafluoroethylene porous film according to claim 4.

10. The polytetrafluoroethylene porous film according to claim 2, wherein the reinforcing material film is selected from a film of the group consisting of polyolefin, polyamide, polyester, tetrafluoroethylene/perfluoroalkyl vinyl ether copolymer, tetrafluoroethylene/hexafluoropropylene copolymer and polytetrafluoroethylene.

11. The polytetrafluoroethylene porous film according to claim 4, wherein the area draw ratio is at least 100.

12. The polytetrafluoroethylene porous film according to claim 4, wherein the area draw ratio is at least 250.

* * * * *

UNITED STATES PATENT AND TRADEMARK OFFICE
CERTIFICATE OF CORRECTION

PATENT NO. : 5,234,739
DATED : August 10, 1993
INVENTOR(S) : Tamaru, et. al.

It is certified that error appears in the above-indentified patent and that said Letters Patent is hereby corrected as shown below:

Title page, item [19], correct the spelling of the inventor's last name from "Tanaur" to Tamaru--.

item [75], correct the spelling of the first inventor's last name from "Tanaru" to --Tamaru--.

Signed and Sealed this

Twentieth Day of June, 1995

Attest:

BRUCE LEHMAN

Attesting Officer      Commissioner of Patents and Trademarks